A. E. INNES.
ADJUSTABLE BRIDGE FOR TRIAL FRAMES.
APPLICATION FILED MAR. 13, 1913.
1,105,790.
Patented Aug. 4, 1914.
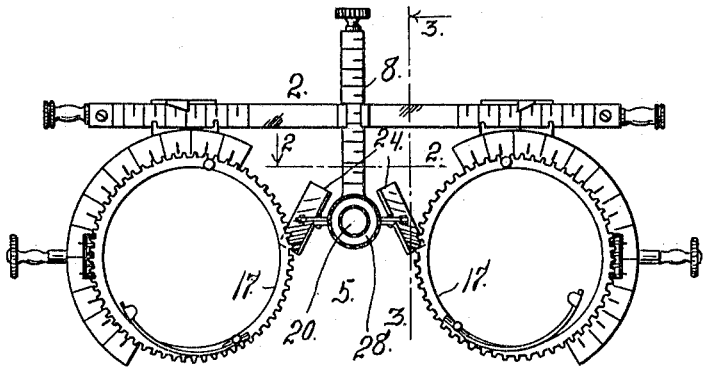
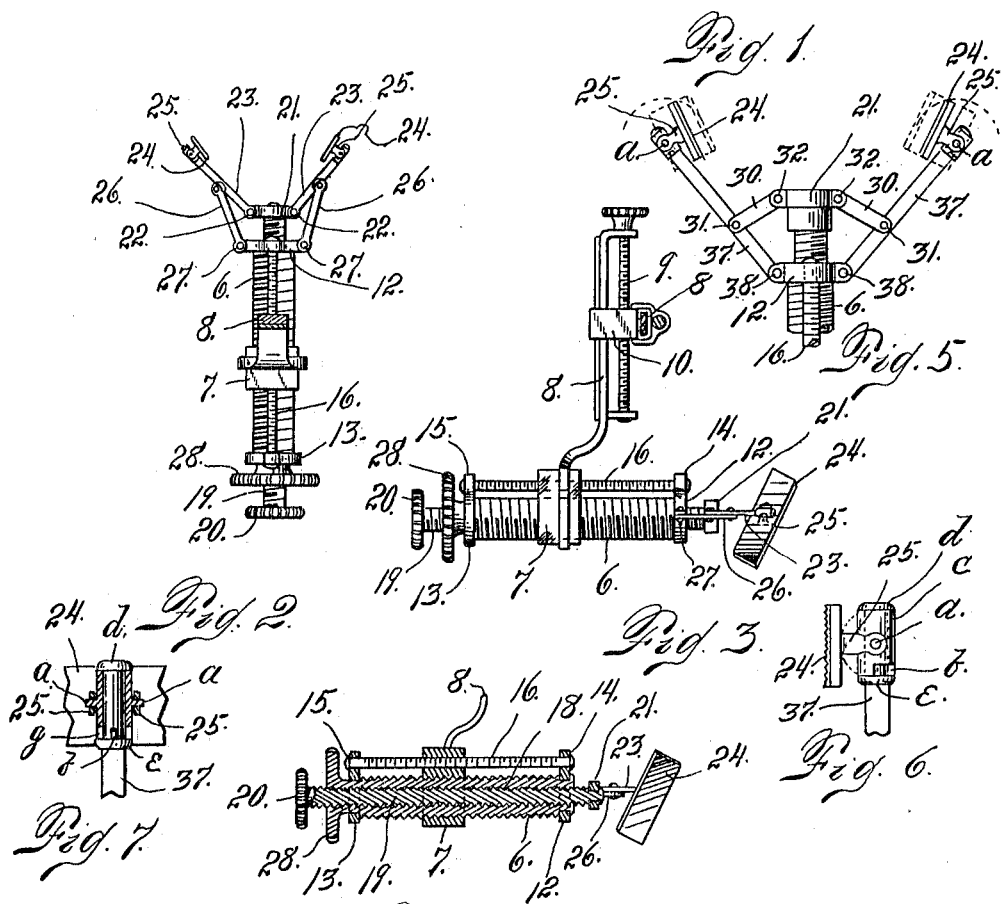

UNITED STATES PATENT OFFICE.

ALBERT E. INNES, OF DENVER, COLORADO.

ADJUSTABLE BRIDGE FOR TRIAL-FRAMES.

1,105,790.    Specification of Letters Patent.    Patented Aug. 4, 1914.

Application filed March 13, 1913. Serial No. 753,996.

*To all whom it may concern:*

Be it known that I, ALBERT E. INNES, a citizen of the United States, residing in the city and county of Denver and State of Colorado, have invented certain new and useful Improvements in Adjustable Bridges for Trial-Frames; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in the class of optical instruments known as "trial frames," which, as the title indicates, are employed in trying lenses in connection with the operation of testing the eyes preparatory to fitting a person with eye-glasses.

My present improvement relates exclusively to an adjustable bridge construction which is adapted for use with an instrument of the aforesaid character. Heretofore, so far as I am aware, these trial frames have been equipped with a crescent-shaped member which is hinged to the inner extremity of the bar located directly in front of the nose and extending between the rings of the instrument which hold the lenses during the trial operation. This crescent-shaped member may be moved toward and away from the nose by the use of a screw journaled in the said bar and passing through a nut mounted on the lower extremity of a vertical bar, the latter being employed for the vertical adjustment of the horizontal bar carrying the crescent-shaped, nose-engaging device. This latter device engages the top of the nose, its proper position being on top of the bridge of the nose, and it is unsatisfactory for the reason that it cannot be clamped to the nose, or secured in any way to prevent it from sliding downwardly on the nose when the instrument is so adjusted as to permit such action, and this is often necessary during the eye-testing operation.

My present improvement consists of a pair of pads adapted to engage the bridge of the nose on opposite sides, the said pads being adjustable independently of the adjustment of the frame toward and away from the nose during the eye-testing act. These pads are connected with the outer extremities of two links, the inner extremities of the said links being pivotally connected with a bearing swiveled on the rear extremity of a screw, the latter passing through a longitudinally disposed threaded opening formed in a larger screw, the latter being threaded in the nut carried by the body of the frame. Pivotally connected with the first pair of links are two other links, the opposite extremities of the latter being pivotally connected with one of the bearings in which the hollow screw is journaled. By virtue of this construction, when the large screw is turned in the nut in a direction to cause it to travel either toward or away from the nose, the smaller screw rotates with it and the relation of the pads is not changed except that they are moved bodily in one direction or the other. The adjustment of the pads is effected entirely by the smaller screw. When this screw is turned in one direction the pads are tightened upon the nose, while when it is turned in the opposite direction, the pads are loosened. When, however, the pads are properly adjusted to the nose, the frame may be moved toward or away from the nose by turning the large screw, without interfering with the adjustment of the pads.

Having briefly outlined my improved construction, I will proceed to describe the same in detail, reference being made to the accompanying drawing, in which is illustrated an embodiment thereof.

In this drawing: Figure 1 is a front view of a trial frame equipped with my improvement. Fig. 2 is a section taken on the line 2—2, Fig. 1, looking downwardly. In this view the construction is shown on a larger scale. Fig. 3 is a section taken on the line 3—3, Fig. 1, looking toward the left. Fig. 4 is a longitudinal section taken axially through the two screws, the section cutting, also, the adjacent parts. Fig. 5 is a fragmentary view illustrating a slightly modified form of construction on a larger scale. Fig. 6 is a detail view on a still larger scale, showing the manner of connecting the pads with the outer extremities of the links to permit self-adjustment of the same, both laterally and longitudinally on the nose of the wearer. Fig. 7 is a similar view partly in section.

The same reference characters indicate the same parts in all the views.

Let the numeral 5 designate the body of the trial frame, which need not be described in detail, since my improvement relates alone to the part of the structure employed to engage the nose, and move the frame toward and away from the latter. A relatively large screw 6 is exteriorly threaded to engage a nut 7 secured to the lower extremity of a vertically disposed bar 8, in which is journaled a screw 9 threaded in a nut 10 carried by the horizontal bar 2 arranged above and extending at right angles to the axis of the screw 6. The opposite extremities of the screw 6 are journaled in bearings 12 and 13, the said bearings being rigidly connected, as shown at 14 and 15, with the opposite extremities of a graduated bar 16 which occupies a position between the toothed rings 17 of the instrument. If the bar 16, together with the bearings 12 and 13, are prevented from longitudinal travel, the nut together with the body of the frame will be caused to travel upon the screw 6 when the latter is rotated in its bearings.

The screw 6 is provided with a threaded perforation 18 extending centrally therethrough and longitudinally thereof. Passing through this threaded perforation is a relatively small screw 19, both extremities of which extend beyond the extremities of the screw 6. The forward extremity of the screw 19 is provided with a milled head 20 for convenience of manipulation. Its rear extremity is journaled in a bearing 21 to which are pivotally connected, as shown at 22, the forward extremities of two links 23 on whose rear extremities are mounted pads 24 adapted to engage the nose of the wearer on opposite sides, the same being located between the eyes of the person who is wearing the frame. Each of the said pads is provided with separated ears 25 pivoted as shown at $a$ on opposite sides of a sleeve $c$, to allow the pad a rocking adjustment on the nose. The sleeve $c$ is rotatably adjustable on the link, between stops or shoulders $d$ and $e$. This rotary movement is limited by a stationary lug $f$ which enters a slot $g$ formed in the sleeve and extending only partway around the latter. Two other links 26 are pivotally connected at their forward extremities to the links 23, approximately midway between the extremities of the latter, the forward extremities of the links 26 being pivotally connected, as shown at 27, to the rear bearing 12 in which the screw 6 is journaled. The forward extremity of the screw 6 is provided with a milled head 28 for convenience of manipulation, the said head being located in the rear of the head 20 of the screw 19.

From the foregoing description, the use and operation of my improved construction will be readily understood.

Assuming that the trial frame is placed in position with the bows engaging the ears of the wearer, the pads 24 may be moved to the proper position, either forward or back, as may be required, and when in such position, the pads may be adjusted by turning the screw 19 within the screw 6. If this screw is moved forwardly, or in a direction to cause the bearing 21 to travel away from the nose, the pads 24 will be tightened or clamped to the opposite sides of the nose; while, if the screw is moved in the opposite direction, the pads will be spread apart or loosened upon the nose. It will thus be seen that the pads are adjusted to the nose for clamping purposes, or to disengage them from the nose, by the screw 19 exclusively, since, when the screw 6 is turned, the screw 19 rotates therewith, the two screws consequently at such time remaining in the same relation to each other. This is due to the fact that the friction incident to the turning of the screw 19 within its bearing 21 is less than that required to cause one screw to turn in or upon the other. From this explanation it will be understood that the frame may be securely mounted upon the nose, whereby it will be more comfortable, since the entire weight of the trial frame is removed from the top of the nose to the sides thereof.

By virtue of my improvement I obtain two or three times more bearing surface upon the nose by the use of the pads, than where the crescent-shaped plate heretofore used, is employed. Furthermore, my improvement is capable of universal use, since it may be made to fit any and all kinds of noses. It will also hold the frame steady in one position, without wabbling.

It is very important that the trial frame should be held steady, and firmly in place, since, under such conditions, refraction will be more nearly absolute. My improvement is also very serviceable, and will last as long as the trial frame. It is exceedingly simple in construction, and almost automatic in its operation. It can be applied to the trial frame at a very slight additional cost over the old construction. It is easily repaired and may be quickly and easily attached to all frames.

In the form of construction shown in Fig. 5, links 27, upon the forward extremities of which the pads are mounted, are pivotally connected at their forward extremities to the bearing 12 as shown at 28; while relatively short links 30 are pivoted at their outer extremities as shown at 31 to the links 27 and at their inner extremities, as shown at 32 to the bearing 21.

From the foregoing description of the manner in which the pads are mounted upon the links, it is evident that these pads will automatically adjust themselves to the shape of the nose, both laterally or up and down on the nose, and longitudinally or lengthwise of the latter.

Having thus described my invention, what I claim is:

1. A trial frame having a hollow screw, a nut carried by the body of the frame in which the screw is threaded, the said screw being journaled in bearings slidably mounted on the frame and being interiorly threaded, a second screw threaded in the first named screw, a bearing in which the second screw is journaled, means for engaging the nose on opposite sides, and an operative connection between the said means and the bearing of the second screw and one of the bearings of the first screw.

2. A trial frame having a hollow screw, a nut carried by the frame in which the said screw is threaded, the screw being journaled in bearings slidably mounted on the body of the frame and being interiorly threaded, a second screw threaded in the first-named screw, a bearing in which the rear extremity of the second screw is journaled, means for engaging the nose on opposite sides, arms on which the said means is mounted, the said arms being pivotally connected with the bearing of the second screw, and links pivotally connecting the said arms with one of the bearings of the first named screw.

3. A trial frame having a hollow screw threaded both interiorly and exteriorly, a nut carried by the body of the frame in which the said screw is threaded, bearings mounted on the body of the frame in which the opposite extremities of the said screw are journaled, a second screw threaded in the first named screw, a bearing in which the second screw is journaled, pads for engaging the nose on opposite sides, and an operative connection between the said pads and the bearing of the second screw and one of the bearings of the first screw.

4. A trial frame having a hollow screw threaded in a nut carried by the body of the frame, bearings slidably mounted on the frame and in which the said screw is journaled, a second screw passing through the hollow of the first named screw and threaded in the latter, pads for engaging the nose on opposite sides, arms on which the said pads are mounted, the said arms being pivotally connected with the bearing of the second screw, and links pivotally connecting the said arms with a bearing of the first named screw.

5. A trial frame equipped with a screw having a longitudinal perforation, the said screw being journaled both interiorly and exteriorly, a nut carried by the body of the frame and in which the said screw is threaded, bearings in which the said screw is journaled, the said bearings being slidably connected with the body of the frame, a second screw threaded in the longitudinal perforation of the first named screw, a bearing in which the second screw is journaled, pads adapted to engage the nose on opposite sides, arms to which the said pads are secured, the said arms being pivotally connected with the bearing of the second screw, and links pivotally connected with the said arms at one extremity and with one of the bearings of the first named screw at their opposite extremities, substantially as described.

6. In a device of the class described, a body frame, an element arranged to be adjusted upon said frame in a direction perpendicular thereto, and nose engaging means mounted upon said element, said means being controllable to grasp or release the nose of the wearer.

7. In a device of the class described, a body frame, an element arranged to be adjusted upon said frame in a direction perpendicular thereto, nose engaging means, and means mounted upon said element adapted to open or close said nose engaging means.

8. In a device of the class described, a body frame, an element arranged to be adjusted upon said frame in a direction perpendicular thereto, a screw mounted upon said element to move toward and away from the frame and nose engaging means connected with said screw and adapted to be opened and closed thereby.

In testimony whereof I affix my signature in presence of two witnesses.

ALBERT E. INNES.

Witnesses:
A. J. O'BRIEN,
ANNA LOUISE LEHMAN.